(12) United States Patent
Yoo et al.

(10) Patent No.: US 12,487,650 B2
(45) Date of Patent: Dec. 2, 2025

(54) COMPUTATIONAL STORAGE DEVICES AND POWER MANAGEMENT METHODS THEREOF

(71) Applicant: SAMSUNG ELECTRONICS CO., LTD., Suwon-si (KR)

(72) Inventors: Hyunjoon Yoo, Suwon-si (KR); Soo-Young Ji, Suwon-si (KR); Heon Jekal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 18/452,110

(22) Filed: Aug. 18, 2023

(65) Prior Publication Data

US 2024/0272691 A1  Aug. 15, 2024

(30) Foreign Application Priority Data

Feb. 9, 2023 (KR) .......................... 10-2023-0017400

(51) Int. Cl.
*G06F 1/28* (2006.01)
(52) U.S. Cl.
CPC ...................................... *G06F 1/28* (2013.01)
(58) Field of Classification Search
CPC ........................................................ G06F 1/28
See application file for complete search history.

(56) References Cited

U.S. PATENT DOCUMENTS

| | | | |
|---|---|---|---|
| 9,070,417 B1 * | 6/2015 | Nagashima | G11B 20/10527 |
| 9,389,675 B2 | 7/2016 | Bose et al. | |
| 9,477,295 B2 | 10/2016 | Jreji et al. | |
| 9,946,481 B2 | 4/2018 | Warriner | |
| 10,552,284 B2 | 2/2020 | Skandakumaran et al. | |
| 10,656,699 B2 | 5/2020 | Bailey et al. | |
| 10,936,049 B2 | 3/2021 | Mocanu et al. | |
| 12,235,713 B2 * | 2/2025 | Shim | G06N 20/00 |
| 2011/0029787 A1 * | 2/2011 | Day | G06F 1/266 713/300 |
| 2017/0269860 A1 * | 9/2017 | Geml | G06F 3/0634 |
| 2018/0226131 A1 * | 8/2018 | Park | G11C 16/3459 |

(Continued)

FOREIGN PATENT DOCUMENTS

KR    20220002095 A    1/2022

*Primary Examiner* — Zahid Choudhury

(74) *Attorney, Agent, or Firm* — Wolf, Greenfield & Sacks, P.C.

(57) ABSTRACT

A computational storage device that is configured to be electrically connected to a host, comprising: a power management integrated circuit that is configured to distribute power; a storage that is configured to store data using a first voltage provided from the power management integrated circuit; a computing module that is configured to perform an operation that is allocated by the host using a second voltage provided from the power management integrated circuit; and a performance monitoring module that is configured to monitor a first workload, a first amount of computation, and/or a first power state of the storage and/or is configured to monitor a second workload, a second amount of computation, and/or a second power state of the computing module and is configured to send a request for additional power to the host based on a monitoring result that is generated by the performance monitoring module.

20 Claims, 10 Drawing Sheets

(56) References Cited

U.S. PATENT DOCUMENTS

| | | | |
|---|---|---|---|
| 2021/0026563 A1* | 1/2021 | Jain | G06F 13/1668 |
| 2021/0064109 A1 | 3/2021 | Tandon et al. | |
| 2021/0405733 A1 | 12/2021 | Olarig et al. | |
| 2022/0236916 A1* | 7/2022 | Esaka | G06F 3/0604 |
| 2022/0392516 A1* | 12/2022 | Cha | G11C 29/4401 |
| 2023/0073518 A1* | 3/2023 | Kao | G06F 3/0679 |
| 2023/0236652 A1* | 7/2023 | Moshe | G06F 1/3203 |
| | | | 713/320 |
| 2025/0044967 A1* | 2/2025 | Kim | G06F 3/0625 |

* cited by examiner

COMPUTATIONAL STORAGE DEVICES AND POWER MANAGEMENT METHODS THEREOF

CROSS-REFERENCE TO RELATED APPLICATIONS

This application claims priority under 35 U.S.C. § 119 to Korean Patent Application No. 10-2023-0017400 filed on Feb. 9, 2023, in the Korean Intellectual Property Office, the disclosures of which are incorporated by reference herein in their entireties.

BACKGROUND

Embodiments of the present disclosure described herein relates to semiconductor memory devices, and more particularly, to computational storage devices and power management methods thereof.

With the rapid increase in the amount of data to be processed, the demand for a large-capacity storage device is increasing. In addition, the demand for high-performance and high-efficiency storage devices capable of rapidly processing large amounts of data has also increased. Conventional computing devices may be implemented with a centralized architecture in which a specific component is configured to control overall operations. In such centralized architecture, the performance of an electronic device may be limited depending on the performance and throughput of its particular circuit or component. Therefore, the centralized architecture may have a limited capability to meet the demand for high-performance and high-efficiency electronic devices.

Storage developed to solve this problem may include computational storage such as smart solid state drive (SSD) or Compute Express Link (CXL) SSD. That is, technology may be developing in a direction in which storage devices having computational functions, such as computational storage, share specific computations such as artificial intelligence AI computations or machine learning ML of a CPU or processor. During this process, the computing module installed inside the computational storage may require a lot of power for complex calculations including AI calculations or machine learning ML. Excessive current consumption by the computing module may adversely affect internal devices or peripheral devices of the computational storage, and sometimes cause sudden power-off SPO.

SUMMARY

Embodiments of the present disclosure provide computational storage devices that can stably receive power and power management methods thereof.

According to some embodiments, a computational storage device that is configured to be electrically connected to a host, comprising: a power management integrated circuit that is configured to distribute power; a storage that is configured to store data using a first voltage provided from the power management integrated circuit; a computing module that is configured to perform an operation that is allocated by the host using a second voltage provided from the power management integrated circuit; and a performance monitoring module that is configured to monitor a first workload, a first amount of computation, and/or a first power state of the storage and/or is configured to monitor a second workload, a second amount of computation, and/or a second power state of the computing module and is configured to send a request for additional power to the host based on a monitoring result that is generated by the performance monitoring module.

According to some embodiments, a computational storage device that is configured to be electrically connected to a host: a power management integrated circuit that is configured to distribute power; a storage that is configured to store data using a first voltage provided from the power management integrated circuit; a computing module that is configured to perform an operation allocated by the host using a second voltage provided from the power management integrated circuit; and a performance monitoring module that is configured to monitor a first workload, a first amount of computation, and a first power state of the storage and/or is configured to monitor a second workload, a second amount of computation, and a second power state of the computing module and is configured to send a request for additional power to the host based on a monitoring result that is generated by the performance monitoring module.

According to some embodiments, a power management method for a plurality of computational storage devices that are electrically connected to a backplane, the method comprising: monitoring a workload, an amount of computation, and/or a power state of each of the plurality of computational storage devices; requesting additional power from a host that is electrically connected to the plurality of computational storage devices and the backplane or from the backplane based on a monitoring result that is generated by the monitoring; determining an additional power supply priority of each of the plurality of computational storage devices; and supplying the additional power to a computational storage device that is selected among the plurality of computational storage devices based on the additional power supply priority.

BRIEF DESCRIPTION OF THE FIGURES

The embodiments of the present disclosure will become more clear from the following detailed description with reference to the accompanying drawings.

DETAILED DESCRIPTION

Figure 1:
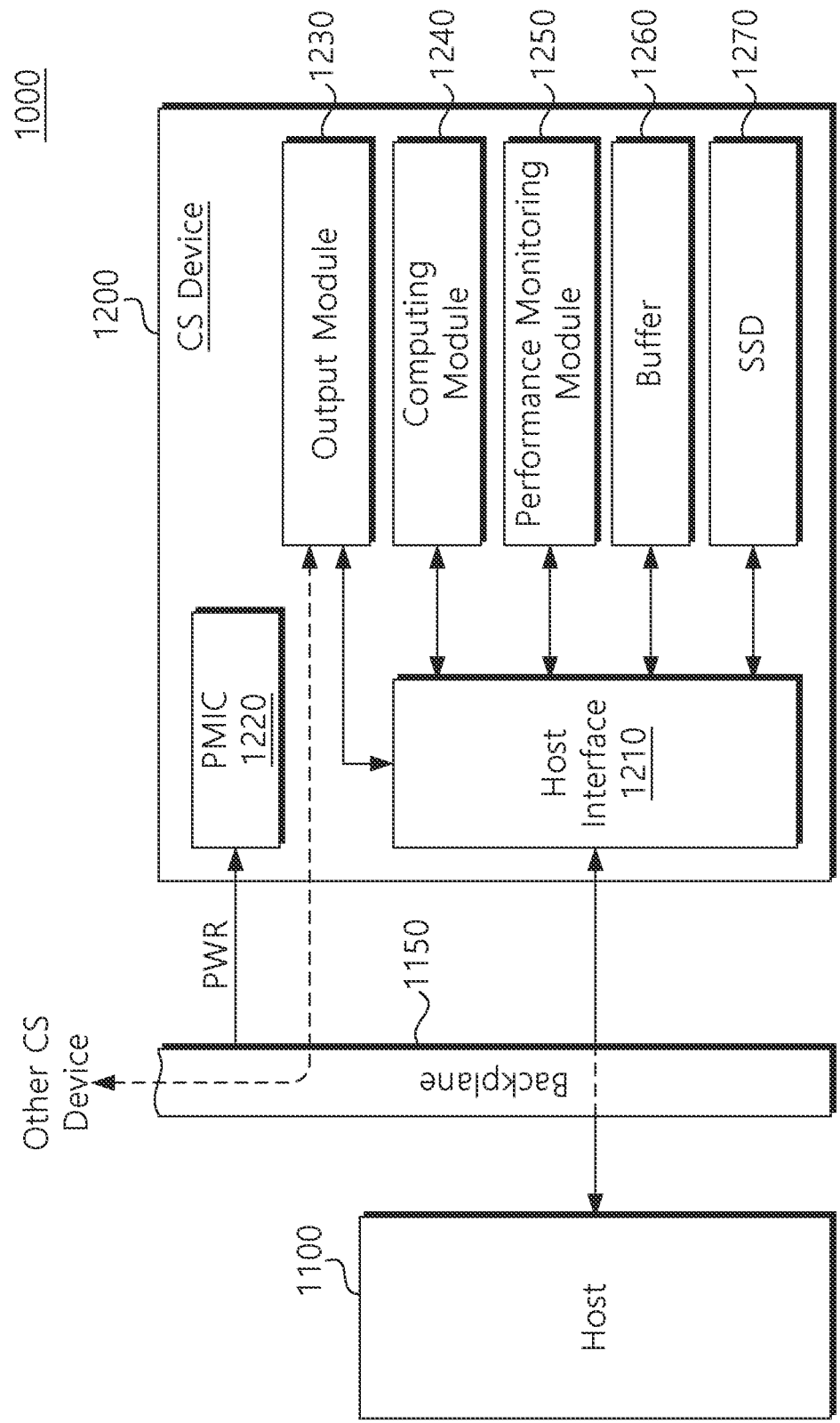
FIG. 1 is a block diagram showing a computing system according to some embodiments of the present invention.

Examples of various embodiments are illustrated and described further below. It will be understood that the description herein is not intended to limit the claims to the specific embodiments described. On the contrary, it is intended to cover alternatives, modifications, and equivalents as may be included within the scope of the present disclosure as defined by the appended claims. The same reference numerals may refer to the same elements herein unless the context clearly indicates otherwise.

FIG. 1 is a block diagram showing a computing system according to some embodiments of the present invention. Referring to FIG. 1, a computing system 1000 may include a host 1100 and a computational storage device 1200. The computing system 1000 may be, for example, a server, desktop computer, laptop computer, tablet computer, smart phone, wearable device, electric vehicle, home appliance, and the like.

The host 1100 may manage and process various operations of the computing system 1000. The host 1100 may perform various arithmetic/logical operations. For example, host 1100 may include one or more processor cores. The host 1100 may include a central processing unit CPU, a graphic processing unit GPU, a host memory, a network interface card NIC, and/or a system bus, but is not limited thereto. In some embodiments, the host 1100 may be a device including one or more processor cores, such as a general-purpose central processing unit CPU, a dedicated application specific integrated circuit ASIC, and/or an application processor AP, but is not limited thereto. The host 1100 may be a processor itself or an electronic device or system including a processor, but is not limited thereto. An operation (e.g., with reference to flowcharts in the drawings), hereinafter, may refer to an operation that can be performed by executing an instruction by at least one hardware, such as, but not limited to, a processor, a device, and a circuit.

The host 1100 may generate commands and data for access to the computational storage device 1200. In particular, the host 1100 may delegate some operations among operations to be processed to the computational storage device 1200. For example, the host 1100 may request the computational storage device 1200 to process a machine learning ML or artificial intelligence AI operation including multiple iteration operations or processing of branch statements. However, the embodiments of the present inventive concept is not limited to a machine learning ML or artificial intelligence AI operation. By distributing these operations, which may use relatively large memory resources, to the computational storage device 1200, the host 1100 may use resources efficiently.

The backplane 1150 may provide a communication interface between the host 1100 and the computational storage device 1200. The backplane 1150 may include signal lines used for communication links and control links, and power supply lines that supply power to various components of the computational storage device 1200. That is, the backplane 1150 may supply power PWR to the computational storage device 1200 under the control of the host 1100 or under the control of its own power control controller. The backplane 1150 may vary the amount of power PWR supplied according to a request of the output module 1230 of the computational storage device 1200. A module, hereinafter, may refer to a hardware structure, such as, but not limited to, a device or a circuit.

In some embodiments, the backplane 1150 may include any type of circuit board configured to electrically connect one or more computational storage devices 1200 to the host 1100. Storage device connectors for electrical connecting one or more computational storage devices 1200 to the backplane 1150 may be arranged on one side of the circuit board. For example, the backplane 1150 may include a standard backplane configuration in which one or more other connectors or connection devices for electrical connecting to the host 1100 are disposed on the other side of the circuit board. In some embodiments, a battery (not shown) to be used as an auxiliary power source of at least one computational storage device 1200 may be electrically connected to the backplane 1150. For example, the backplane 1150 may stably supply power PWR to one or more computational storage devices 1200 using a battery and/or constant power.

As used herein, the backplane 1150 may also refer to a component of a circuit board that can be used to physically and electrically connect one or more computational storage devices 1200 to the host 1100. For example, the backplane 1150 may include two sets of connectors or interconnect devices on the same side of a circuit board. The backplane 1150 may include a single circuit board or may be implemented with multiple circuit boards and/or sets of connectors or connections.

The computational storage device 1200 may store data according to a request of the host 1100 or may perform an operation requested by the host 1100. To this end, the computational storage device 1200 may include a host interface 1210, a power management integrated circuit (PMIC) 1220, an output module 1230, a computing module 1240, a performance monitoring module 1250, a buffer 1260, and/or SSD 1270, but is not limited thereto.

The host interface 1210 may be provided as a physical and/or an electrical communication channel of the computational storage device 1200 for data exchange with the host 1100. The host interface 1210 may have an interfacing protocol supporting a direct memory access (DMA) function of at least one of the output module 1230, the computing module 1240, the performance monitoring module 1250, the buffer 1260, and the SSD 1270. For example, the buffer 1260 or the SSD buffer (not shown) of the SSD 1270 may be managed as a virtual memory space by a memory management unit (MMU, not shown) of the host 1100 and the host interface 1210.

The PMIC 1220 may distribute power PWR provided through the backplane 1150 to components of the computational storage device 1200. The PMIC 1220 may convert power PWR provided from the backplane 1150 into a stable voltage. The PMIC 1220 may supply stabilized voltage to components such as host interface 1210, output module 1230, computing module 1240, performance monitoring module 1250, buffer 1260, and/or SSD 1270.

The output module 1230 may transmit power status information generated by the performance monitoring module 1250 and a request for additional power to the host 1100 through the backplane 1150. In some embodiments, the output module 1230 may transmit power status information generated by the performance monitoring module 1250 and a request for additional power to another computational storage device (not shown) electrically connected to the backplane 1150. In some embodiments, the output module 1230 may transmit the workload status of the computational storage device 1200 generated by the performance monitoring module 1250, a workload distribution request, and/or a sudden power-off (SPO) prediction flag to the host 1100. In some embodiments, the output module 1230 may transmit at least one of the workload status of the computational storage device 1200 generated by the performance monitoring module 1250, the SPO prediction flag, and the workload distribution request to another computational storage device (not shown) electrically connected to the backplane 1150. The output module 1230 may communicate with the host 1100 or the backplane 1150 through the host interface 1210. In some embodiments, the output module 1230 may communicate with the host 1100 or the backplane 1150 through an interface independent from the host interface 1210. For example, the output module 1230 may communicate with the host 1100 or the backplane 1150 using I2C, UART, and/or SMbus, but the embodiments of the independent interface are not limited therego.

The computing module 1240 may be an operation logic dedicated to performing a specific operation requested by the host 1100. For example, the computing module 1240 may use the buffer 1260 to execute an application for processing an operation requested by the host 1100. In some embodiments, the computing module 1240 may be provided as a dedicated processor that executes an operation allocated by the host 1100. Here, the operation allocated by the host 1100 may be an artificial intelligence AI operation or machine learning ML operation, but is not limited thereto. For example, the computing module 1240 may include a central processing unit CPU, an application processor AP, a graphics processing unit GPU, a neural processing unit NPU, a tensor processing unit TPU, a vision processing unit VPU, ISP (Image Signal Processor), and/or DSP (Digital Signal Processor) to perform the allocated and/or requested operations by the host 1100. However, the processor included in the computing module 1240 of the present inventive concept is not limited thereto. In some embodiments, the computing module 1240 may be, but is not limited to, a device such as a Field Programmable Gate Array (FPGA) programmed for a specific operation. The computing module 1240 may perform an operation that is allocated by the host 1100 using a first voltage provided from the PMIC 1220.

The performance monitoring module 1250 may monitor workloads or calculations of components of the computational storage device 1200, such as the computing module 1240, the buffer 1260, and the SSD 1270. Performance monitoring module 1250 may receive current workload status from components such as computing module 1240, buffer 1260, and SSD 1270. Further, the performance monitoring module 1250 may transmit an additional power request to the backplane 1150 or the host 1100 through the output module 1230 when an amount of operation equal to or greater than a reference value is observed in a specific component of the computational storage device 1200. Then, power PWR supplied to the computational storage device 1200 by the backplane 1150 or the host 1100 may increase.

In some embodiments, the performance monitoring module 1250 may determine whether a power shortage is caused by an operation in the computing module 1240 or an operation in the SSD 1270 executed according to a request of the host 1100. For example, the performance monitoring module 1250 may monitor whether or not power PWR is insufficient due to, for example, the AI operation or the machine learning ML operation performed by the computing module 1240. Also, the performance monitoring module 1250 may monitor whether or not the power PWR for the operation performed inside the SSD 1270 is insufficient. According to the monitoring result, the performance monitoring module 1250 may request additional power or give priority of supplying additional power to another computational storage device electrically connected to the backplane 1150.

In some embodiments, the performance monitoring module 1250 may trigger a backup operation in preparation for sudden power-off SPO of the computational storage device 1200 due to excessive current consumption by the computing module (e.g., computing module 1240). If a sudden power-off SPO is expected, the performance monitoring module 1250 may suspend a specific operation performed in the computing module 1240 and backs up status information and parameters of the suspended operation. The backed-up status information and parameters may be stored in another computational storage device electrically connected to the output module 1230 through the backplane 1150, in the host 1100, or in a separately provided storage. Later, when the computational storage device 1200 is restored from sudden power-off SPO, the performance monitoring module 1250 may control the computing module 1240 to receive the backed-up status information and parameters, and continue the suspended operation. In some embodiments, the performance monitoring module 1250 may request another computational storage device to continue executing the suspended operation using the backed-up status information and parameters.

The buffer 1260 may be used as a buffer or operating memory of the computational storage device 1200. The buffer 1260 may write data or output the written data under the control of the host 1100. The buffer 1260 may store a workload status, a power state, an amount of computation, and the like of components such as the computing module 1240 and/or the SSD 1270 collected by the performance monitoring module 1250. The buffer 1260 may store status information about whether power PWR is insufficient due to, for example, the AI operation or the machine learning ML operation of the computing module 1240. In some embodiments, the buffer 1260 may back up parameters or status information of a specific operation suspended in the computing module 1240 when sudden power-off SPO is expected. Afterwards, the backed-up parameters and status information may be transmitted from the buffer 1260 to the host 1100 or other computational storage devices. For example, the Buffer 1260 may be implemented as high-bandwidth memory HBM. According to some embodiments, the buffer 1260 may include SDRAM, NAND flash memory, NOR flash memory, phase-change RAM (PRAM), resistive RAM (ReRAM), ferroelectric RAM (FRAM), and spin-torque magnetic RAM (STT-MRAM). However, the embodiments of the buffer 1260 of the present inventive concept are not limited thereto.

The SSD 1270 may be provided as storage of the computational storage device 1200. The SSD 1270 may write data to or read stored data from a non-volatile memory device (not shown) such as a NAND flash memory in response to various data write and read requests. The SSD 1270 may include a Flash Translation Layer FTL that internally performs, for example, garbage collection, address mapping, wear leveling, and the like. Disadvantages of the nonvolatile memory device (e.g., NAND flash memory), such as erase-before-write and mismatch between an erase unit and a write unit, may be supplemented by the flash translation layer FTL. Accordingly, a power shortage condition may be caused even in the SSD 1270 according to an increase in the amount of computation. In addition, the SSD 1270 may further include a computing device such as an FPGA. A detailed configuration of the SSD 1270 will be described in detail in FIG. 2 to be described later. The storage (e.g., SSD 1270) may store data using a second voltage provided from the PMIC 1220. The storage (e.g., SSD 1270) may include an operation block (e.g., circuit) that performs an auxiliary operation for input/output of data.

According to the computing system 1000 described above, the computational storage device 1200 that requests additional power from the outside according to the workload status or power state of internal components may be provided. In some embodiments, the computational storage device 1200 may stop an operation being processed in the computing module 1240 and perform a backup operation when an event such as sudden power-off SPO is expected. In addition, the computational storage device 1200 may transfer status information or parameters of the suspended operation to another computational storage device electrically connected to the backplane 1150. Then, another computational storage device electrically connected to the backplane 1150 may continue executing the suspended operation.

Figure 2:
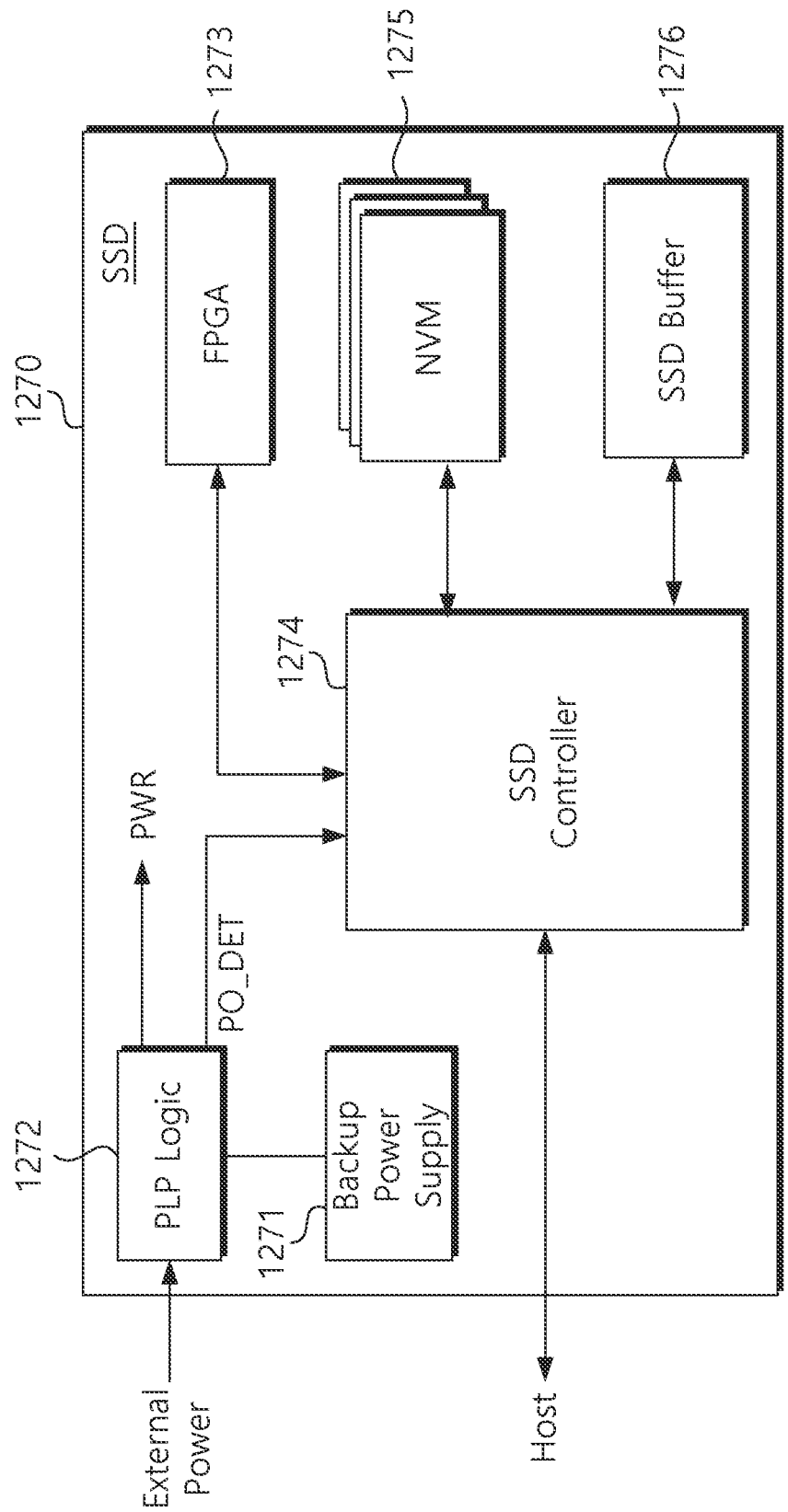
FIG. 2 is a block diagram showing the configuration of the solid state drive shown in FIG. 1 by way of example.

FIG. 2 is a block diagram showing the configuration of the solid state drive shown in FIG. 1 by way of example. Referring to FIG. 2, an SSD 1270 may include, for example, a backup power supply 1271, a power loss prevention logic 1272, an FPGA 1273, an SSD controller 1274, a nonvolatile memory device 1275, and an SSD buffer 1276. However, the embodiments of the SSD 1270 of the present inventive concept is not limited thereto.

The backup power supply 1271 may supply stored energy to the SSD 1270 when a power-off event occurs in which external power is cut off. The SSD 1270 may use energy from the backup power supply 1271 to complete the operation being performed and perform a data backup operation. Therefore, the reliability of the backup operation may be increased by using the limited energy accumulated in the backup power supply 1271 efficiently. The backup power supply 1271 may be, for example, a power supply using a capacitor. As used hereinafter, the terms "external/outside device", "external/outside power", external/outside signal", or "outside" are intended to broadly refer to a device, circuit, block, module, power, and/or signal that resides externally (i.e., outside of a functional or physical boundary) with respect to a given circuit, block, module, system, or device.

The power loss prevention logic 1272 may be a component for preventing data loss due to the loss of the power that is supplied to the SSD 1270. The power loss prevention logic 1272 may be formed as an integrated circuit IC, chip, and/or device. In a situation where external power is normally supplied, the power loss prevention logic 1272 may provide the external power as device power PWR to the SSD 1270. On the other hand, the power loss prevention logic 1272 may provide the output of the backup power supply 1271 to the SSD 1270 as the device power PWR when external power is cut off.

In some embodiments, the power loss prevention logic 1272 may detect a sudden power-off SPO event such as external power cut-off or serious voltage drop. When a sudden power-off SPO event is detected, the power loss prevention logic 1272 may provide a power-off detection signal PO_DET to the SSD controller 1274. Also, the power loss prevention logic 1272 may switch the source of the device power PWR for driving the SSD 1270 from external power to the backup power supply 1271.

The FPGA 1273 may be a programmable semiconductor device and may perform various operations based on, for example, a program input by a user (or a circuit change by a user). The FPGA 1273 may be replaced with a non-limiting type of device capable of performing various operations according to an input program. The FPGA 1273 may be configured to implement some functions of various hardware constituting the SSD 1270 as software using program functions.

The SSD controller 1274 may be configured to control the nonvolatile memory device 1275 and the SSD buffer 1276 according to a command or control from a host 1100. For example, the SSD controller 1274 may write data to the nonvolatile memory device 1275 or read data stored in the nonvolatile memory device 1275 according to a request of the host 1100. To access the nonvolatile memory device 1275, the SSD controller 1274 may provide commands, addresses, data, and/or control signals to the nonvolatile memory device 1275.

The nonvolatile memory device 1275 may store data received from the SSD controller 1274 or transmit stored data to the SSD controller 1274. The nonvolatile memory device 1275 may be provided as an actual storage medium of the computational storage device 1200. For example, the nonvolatile memory device 1275 may be provided as a NAND flash memory having a large storage capacity. The nonvolatile memory device 1275 may include a plurality of NAND flash memory devices.

The SSD buffer 1276 may be used as a data buffer for exchanging data between the SSD 1270 and the host 1100. Write data provided from the host 1100 or data read from the nonvolatile memory device 1275 may be temporarily stored in the SSD buffer 1276. When data existing in the nonvolatile memory device 1275 is cached upon a read request from the host 1100, the SSD buffer 1276 may support a cache function that directly provides the cached data to the host 1100. The SSD buffer 1276 may be provided as synchronous DRAM to provide sufficient buffering in the SSD 1270 that may be used as a large-capacity auxiliary storage device. However, the embodiments of the SSD buffer 1276 of the present inventive concept are not limited thereto.

According to the SSD 1270 of the present invention described above, the amount of computation for managing the SSD 1270 that is conducted in the FPGA 1273 and/or the SSD controller 1274 may increase. The amount of computation or workload of the FPGA 1273 and/or the SSD controller 1274 may be separately monitored by the performance monitoring module 1250 (see FIG. 1). In some embodiments, when the amount of computation increases beyond the reference value, an additional power request may be generated by the performance monitoring module 1250.

In some embodiments, some of components such as the backup power supply 1271, the power loss prevention logic 1272, the FPGA 1273, and the SSD buffer 1276 included in the SSD 1270 may be placed outside the SSD 1270 or omitted. That is, in some embodiments, the SSD 1270 may include only the SSD controller 1274 and the nonvolatile memory device 1275 to perform only a simple storage function.

Figure 3:
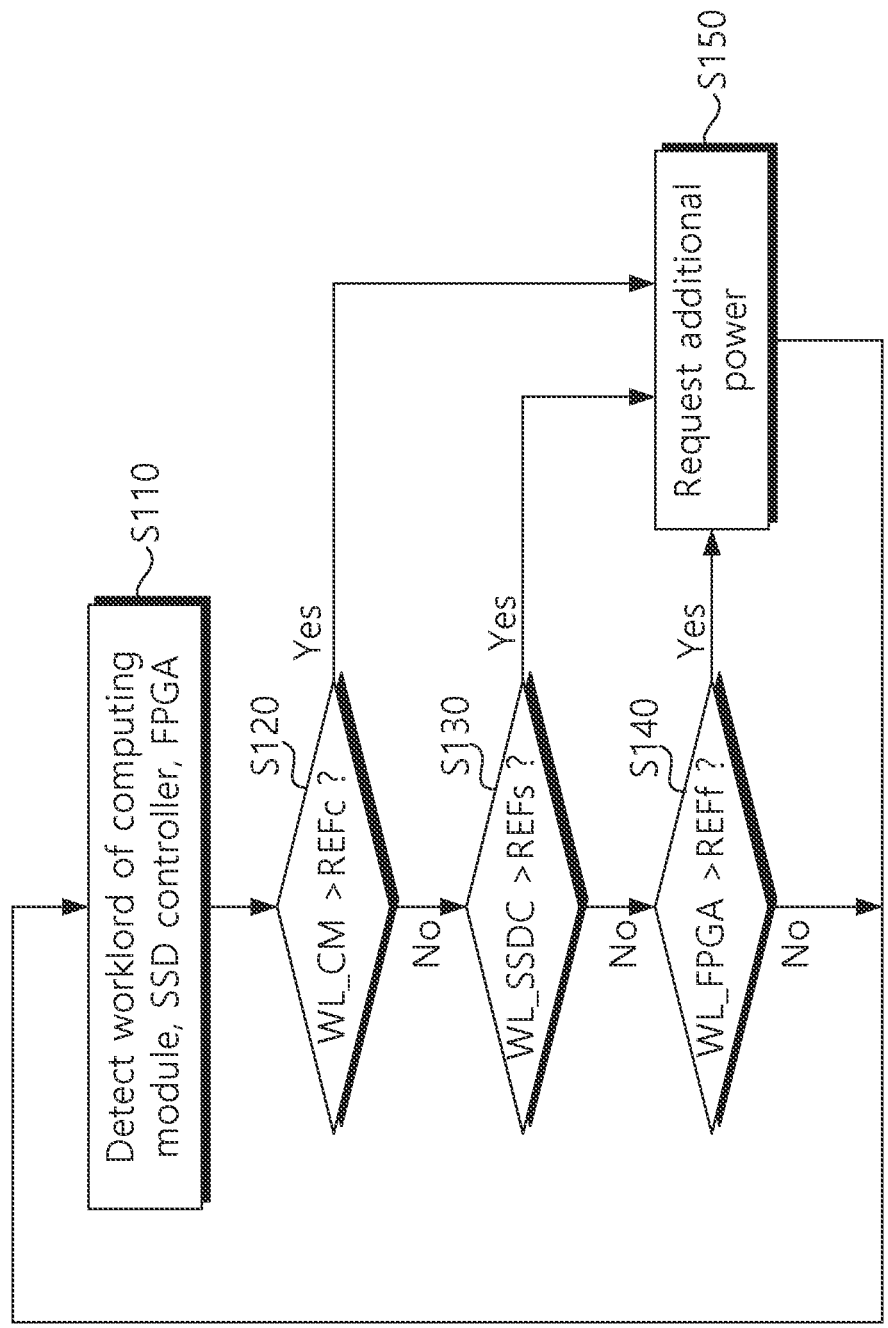
FIG. 3 is a flowchart briefly illustrating a monitoring operation performed by a performance monitoring module in the computational storage device according to some embodiments of the present invention.

FIG. 3 is a flowchart briefly illustrating a monitoring operation performed by a performance monitoring module in the computational storage device according to some embodiments of the present invention. Referring to FIG. 3, the performance monitoring module 1250 (see FIG. 1) may monitor the computing module 1240 of the computational storage device 1200 and the FPGA 1273 and/or the SSD controller 1274 inside the SSD 1270. Also, the performance monitoring module 1250 may request additional power from the backplane 1150 or the host 1100 according to the monitoring result.

In step S110, the performance monitoring module 1250 may monitor the workload for major operations performed in the computational storage device 1200. For example, the performance monitoring module 1250 may monitor the workload of the computing module 1240 of the computational storage device 1200. In some embodiments, the performance monitoring module 1250 may monitor the workload or calculation amount of the FPGA 1273 for the SSD 1270 and the workload or calculation amount of the SSD controller 1274.

In step S120, the performance monitoring module 1250 may receive the workload (e.g., workload information or workload status) WL_CM from the computing module 1240. The performance monitoring module 1250 may compare the workload WL_CM of the computing module 1240 with the reference value REFc. If the workload WL_CM of the computing module 1240 exceeds the reference value REFc ('Yes' direction), the process may move to step S150 to request additional power. When the workload WL_CM of the computing module 1240 is equal to or less than the reference value REFc ('No' direction), the process may move to step S130.

In step S130, the performance monitoring module 1250 may receive the workload (e.g., workload information or workload status) WL_SSDC of the SSD controller 1274 from the SSD 1270. The performance monitoring module 1250 may compare the workload WL_SSDC of the SSD controller 1274 with reference value REFs. If the workload WL_SSDC of the SSD controller 1274 exceeds the reference value REFs ('Yes' direction), the procedure may move to step S150 for requesting additional power. When the workload WL_SSDC of the SSD controller 1274 is equal to or less than the reference value REFs ('No' direction), the process may move to step S140.

In step S140, the performance monitoring module 1250 may receive the workload (e.g., workload information or workload status) WL_FPGA of the FPGA 1273 for the SSD 1270. The performance monitoring module 1250 compare the workload WL_FPGA of the FPGA 1273 with the reference value REFf. If the workload WL_FPGA of the FPGA 1273 exceeds the reference value REFf ('Yes' direction), the procedure may move to step S150 for requesting additional power. If the workload WL_FPGA of the FPGA 1273 is equal to or less than the reference value REFf ('No' direction), the process may return to step S110 to provide workload information on major operations performed in the computational storage device 1200.

In step S150, the performance monitoring module 1250 may request additional power from the backplane 1150 or the host 1100 through the output module 1230 because the workload or calculation amount exceeding the reference value is detected. Then, power PWR supplied to the computational storage device 1200 by the backplane 1150 or the host 1100 may increase. When the supply of additional power is completed, the process may return to step S110.

In the foregoing, a method for monitoring a workload or an amount of computation of computational devices (e.g., the computational storage device 1200) included in the computational storage device 1200 performed by the performance monitoring module 1250 according to an embodiment of the present invention has been described. The performance monitoring module 1250 may support stable power supply of the computational storage device 1200 by requesting additional power from the backplane 1150 or the host 1100 when the workload or calculation amount of the computing devices exceeds a reference value.

Figure 4:
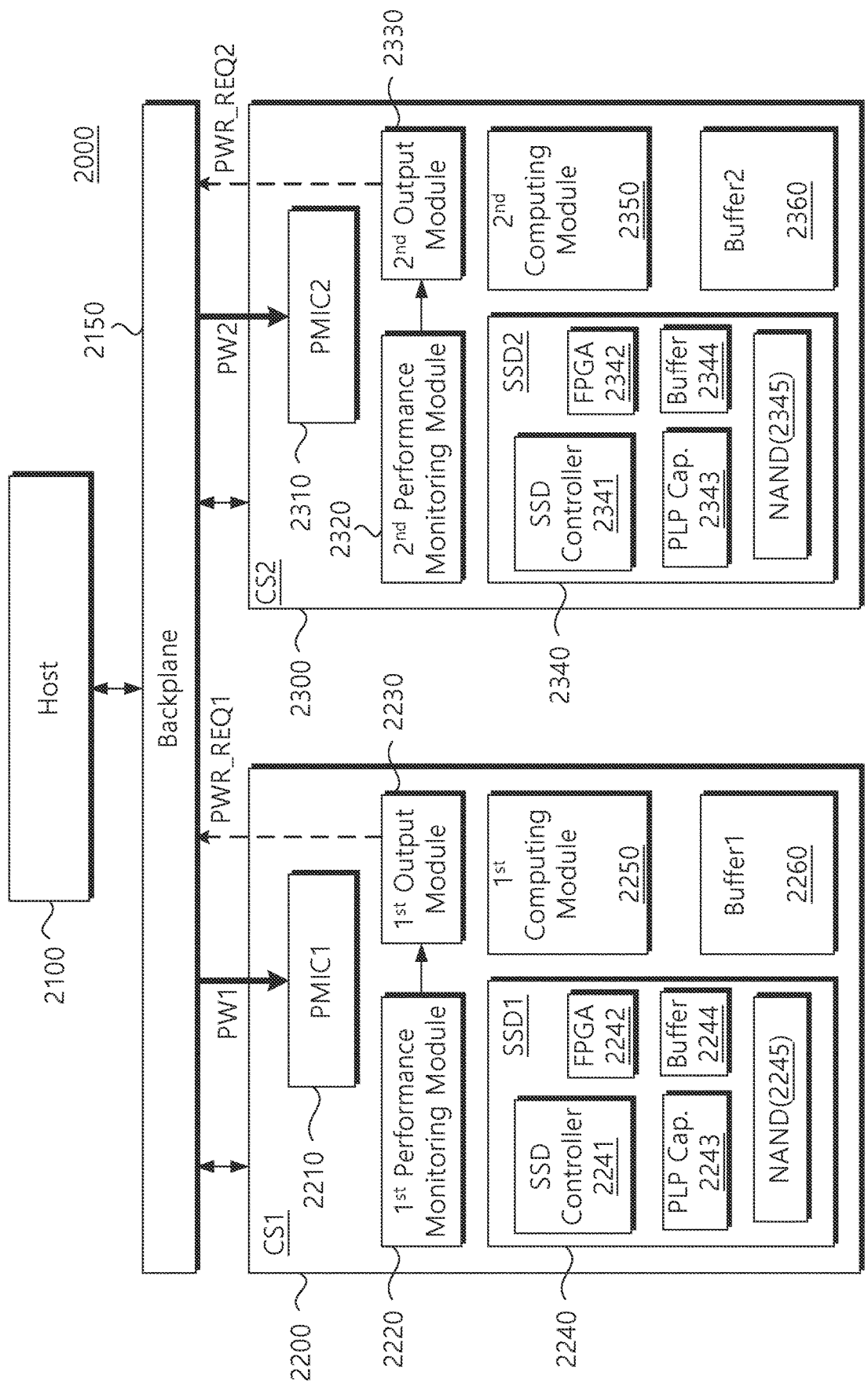
FIG. 4 is a block diagram showing a computing system according to some embodiments of the present invention.

FIG. 4 is a block diagram showing a computing system according to some embodiments of the present invention. Referring to FIG. 4, a computing system 2000 may include a host 2100 and a plurality of computational storage devices 2200 and 2300. The number of the plurality of computational storage devices are not limited to thereto. For example, the number of the plurality of computational storage devices may be more than two. The computing system 2000 may be, for example, a device or system such as a server or a data center that collects and processes big data.

The host 2100 may perform substantially the same functions as the host 1100 of FIG. 1. Host 2100 may include one or more CPU and/or GPU cores. The host 2100 may include a host memory, a network interface card NIC, and a system bus. In some embodiments, the host 2100 may be a device including a processor core, such as a general-purpose central processing unit CPU, a dedicated application specific integrated circuit ASIC, and/or an application processor AP. The host 2100 may be a processor itself or an electronic device or system including a processor.

The host 2100 may generate commands and data for access to the computational storage devices 2200 and/or 2300. The host 2100 may delegate some of the operations to be processed to the computational storage devices 2200 and/or 2300. For example, the host 2100 may request the computational storage devices 2200 and/or 2300 to process machine learning ML or artificial intelligence AI operations. However, the operations delegated to the computational storage devices 2200 and/or 2300 of the present inventive concept are not limited thereto. In some embodiments, the host 2100 may determine an additional power supply priority of the computational storage devices 2200 and 2300. For example, when the host 2100 receives an additional power request from both of the computational storage devices 2200 and 2300, the host 2100 may preferentially provide additional power to one computational storage device in consideration of the importance or urgency of the operation to be processed.

The backplane 2150 may provide a communication interface between the host 2100 and the computational storage devices 2200 and 2300. Backplane 2150 may include signal lines used for communication links and control links, and power supply lines that supply power to various components of the computing system 2000 such as various components of the computational storage devices 2200 and 2300. That is, the backplane 2150 may supply power PW1 and PW2 to the computational storage devices 2200 and 2300, respectively under the control of the host 2100 or under the control of the backplane 2150's own power controller. The backplane 2150 may vary the sizes of the supplied powers PW1 and PW2 according to requests from the output modules 2230 and 2330 of the computational storage devices 2200 and 2300, respectively.

The computational storage devices 2200 and 2300 may store data according to a request of the host 2100 or perform a specific operation requested by the host 2100. To this end, the first computational storage device 2200 may include, for example, a first PMIC 2210, a first performance monitoring module 2220, a first output module 2230, a first SSD 2240, and a first computing module 2250, and/or a first buffer 2260. Although not shown, the first computational storage device 2200 may further include a host interface. The second computational storage device 2300 may include a second PMIC 2310, a second performance monitoring module 2320, a second output module 2330, a second SSD 2340, a second computing module 2350, and a second buffer 2360.

Similarly, the second computational storage device 2300 may further include a host interface.

The first PMIC 2210 may distribute the power PW1 provided through the backplane 2150 to various components of the first computational storage device 2200. The first PMIC 2210 may convert the power PW1 provided from the outside into a stable voltage. The first PMIC 2210 may transmit the stabilized voltage to the first performance monitoring module 2220, the first output module 2230, the first SSD 2240, the first computing module 2250, and/or the first buffer 2260.

The first performance monitoring module 2220 may monitor workloads or calculations of the first SSD 2240 and the first computing module 2250, which are components of the first computational storage device 2200. In some embodiments, the first performance monitoring module 2220 may individually monitor the performance of the SSD controller 2241 and the first FPGA 2242 of the first SSD 2240. The first performance monitoring module 2220 may receive workload status of the SSD controller 2241, the first FPGA 2242, and the first computing module 2250. In addition, the first performance monitoring module 2220 may transmit an additional power request to the backplane 2150 or the host 2100 through the first output module 2230 when an operation amount equal to or greater than a reference value is observed in a specific component. Then, power PW1 supplied to the first computational storage device 2200 by the backplane 2150 or the host 2100 may increase. The first performance monitoring module 2220 may further include a buffer for receiving and temporarily storing workloads, calculation amounts, or power states of the first SSD 2240 and the first computing module 2250.

In some embodiments, the first performance monitoring module 2220 may detect power shortage caused by a specific operation of the first computing module 2250 or an operation of the first SSD 2240 executed according to a request of the host 2100. For example, the first performance monitoring module 2220 may monitor whether the power PW1 is insufficient or overloaded due to an AI operation or a machine learning ML operation performed by the first computing module 2250. In some embodiments, the first performance monitoring module 2220 may monitor whether the power PW1 supplied for the operation performed by the first SSD 2240 is insufficient or overloaded. According to the monitoring result, the first performance monitoring module 2220 may request additional power for the first computational storage device 2200 (e.g., for the first SSD 2240) or give priority of supplying additional power to another computational storage device (e.g., the second computational storage device 2300) electrically connected to the backplane 2150.

In some embodiments, the first performance monitoring module 2220 may trigger a backup operation in preparation for sudden power-off SPO of the first computational storage device 2200. If a sudden power-off SPO is expected, the first performance monitoring module 2220 may suspend a specific operation performed in the first computing module 2250, and back-up the operation parameters and status information of the suspended state. The backed-up operation parameters and status information may be stored in the second computational storage device 2300, the host 2100, or a separately provided storage through the first output module 2230. Then, the second computational storage device 2300 may instead execute the suspended operation using the backed-up parameter and status information. In some embodiments, when the first computational storage device 2200 is restored from sudden power-off SPO, the operation parameter and status information that have been backed up may be returned and the suspended operation may be subsequently performed by the first computational storage device 2200.

In some embodiments, when a sudden power-off SPO in the first computing module 2250 is expected, the first performance monitoring module 2220 may suspend a specific operation performed in the first computing module 2250. And then, the first performance monitoring module 2220 may back up operation parameters and status information of the suspended state to the first SSD 2240. The backed-up operation parameters and status information may be returned from the first SSD 2240 to the first computing module 2250 when the first computational storage device 2200 is restored from sudden power-off SPO. Then, the first computing module 2250 may subsequently perform the suspended operation using the returned operation parameter and status information.

The first output module 2230 may transmit power status information generated by the first performance monitoring module 2220 and a request for additional power to the host 2100 through the backplane 2150. In some embodiments, the first output module 2230 may transmit power status information generated by the first performance monitoring module 2220 and additional power request to another computational storage device (not shown) electrically connected to the backplane 2150. In some embodiments, the first output module 2230 may transmit, for example, the workload status of the first computational storage device 2200 generated by the first performance monitoring module 2220, a workload distribution request, and/or a sudden power-off SPO prediction flag to the host 2100. In some embodiments, the first output module 2230 may transmit, for example, the workload status of the first computational storage device 2200 generated by the first performance monitoring module 2220, the SPO prediction flag, and/or the workload distribution request to the second computational storage device 2300 electrically connected to the backplane 2150. The first output module 2230 may communicate with the host 2100 or the backplane 2150 through a host interface (not shown), but may communicate with the host 2100 or the backplane 2150 through a separate independent interface. For example, the first output module 2230 may communicate with the host 2100 or the backplane 2150 using interfaces, for example, I2C, UART, and/or SMbus.

The first SSD 2240 may be provided as storage of the first computational storage device 2200. The first SSD 2240 may write data into the NAND flash memory 2245 or read data stored in the NAND flash memory 2245 in response to various data write and read requests. The first SSD 2240 may include an SSD controller 2241 that executes a Flash Translation Layer FTL that performs, for example, garbage collection, address mapping, wear leveling, and/or the like. In some embodiments, the first SSD 2240 may include a first FPGA 2242 capable of performing an operation for memory management or an operation separate from memory management, a power loss protection PLP capacitor 2243, a buffer 2244, and a NAND flash memory 2245. The first performance monitoring module 2220 may monitor the workload of the SSD controller 2241 and the first FPGA 2242 with a large amount of computation together with the workload of the first computing module 2250.

The first computing module 2250 may perform, for example, artificial intelligence AI operation or machine learning ML operation requested by the host 2100 to the first computational storage device 2200. The first computing module 2250 may process such operations using, for example, CPU, AP, GPU, NPU, TPU, VPU, Image Signal Processor (ISP), and/or Digital Signal Processor (DSP). In some embodiments, the first computing module 2250 may be a device such as a Field Programmable Gate Array (FPGA) programmed for a specific operation.

The first buffer 2260 may be used as a buffer or operating memory of the first computational storage device 2200. The first buffer 2260 may write data or output the written data according to the control of the host 2100. The first buffer 2260 may store the workload status of the first SSD 2240 and/or the first computing module 2250 collected by the first performance monitoring module 2220. The first buffer 2260 may store status information about whether or not the power PW1 is insufficient or overloaded due to, for example, an AI operation or a machine learning ML operation of the first computing module 2250. In some embodiments, the first buffer 2260 may back up operation parameters and status information of a specific operation suspended by the first computing module 2250 when a sudden power-off SPO is expected. Then, the backed-up operation parameters and status information may be transmitted from the first buffer 2260 to the host 2100 or the second computational storage device 2300. In some embodiments, the backed up operation parameters and status information may be backed up from the first buffer 2260 to the first SSD 2240. The second computational storage device 2300 may include substantially the same components as the first computational storage device 2200. That is, the second PMIC 2310, the second performance monitoring module 2320, the second output module 2330, the second SSD 2340, the second computing module 2350, and the second buffer 2360 may be the same as those of the first computational storage device 2200. Accordingly, a detailed description of the components of the second computational storage device 2300 will be omitted.

However, the second SSD 2340 may store data different from that of the first SSD 2240. In some embodiments, the second computing module 2350 may perform an operation different from that of the first computing module 2250 (e.g., when the first performance monitoring module 2220 does not request a backup operation). However, if there is an operation requested by the first performance monitoring module 2220, the second computing module 2350 may execute the operation suspended by the first computing module 2250 instead.

According to the computing system 2000 described above, the computational storage devices 2200 and 2300 that request additional power from the outside according to the workload or power state of their components may be provided. In some embodiments, when the computational storage devices 2200 and 2300 need to use limited power, one of the computational storage devices 2200 and 2300 may receive more power according to a priority determined by the performance monitoring modules 2220 and 2320. In some embodiments, the computational storage devices 2200 and 2300 may stop an operation being processed by the computing modules 2250 and 2350, respectively and perform a backup operation when sudden power-off SPO is expected.

Figure 5:
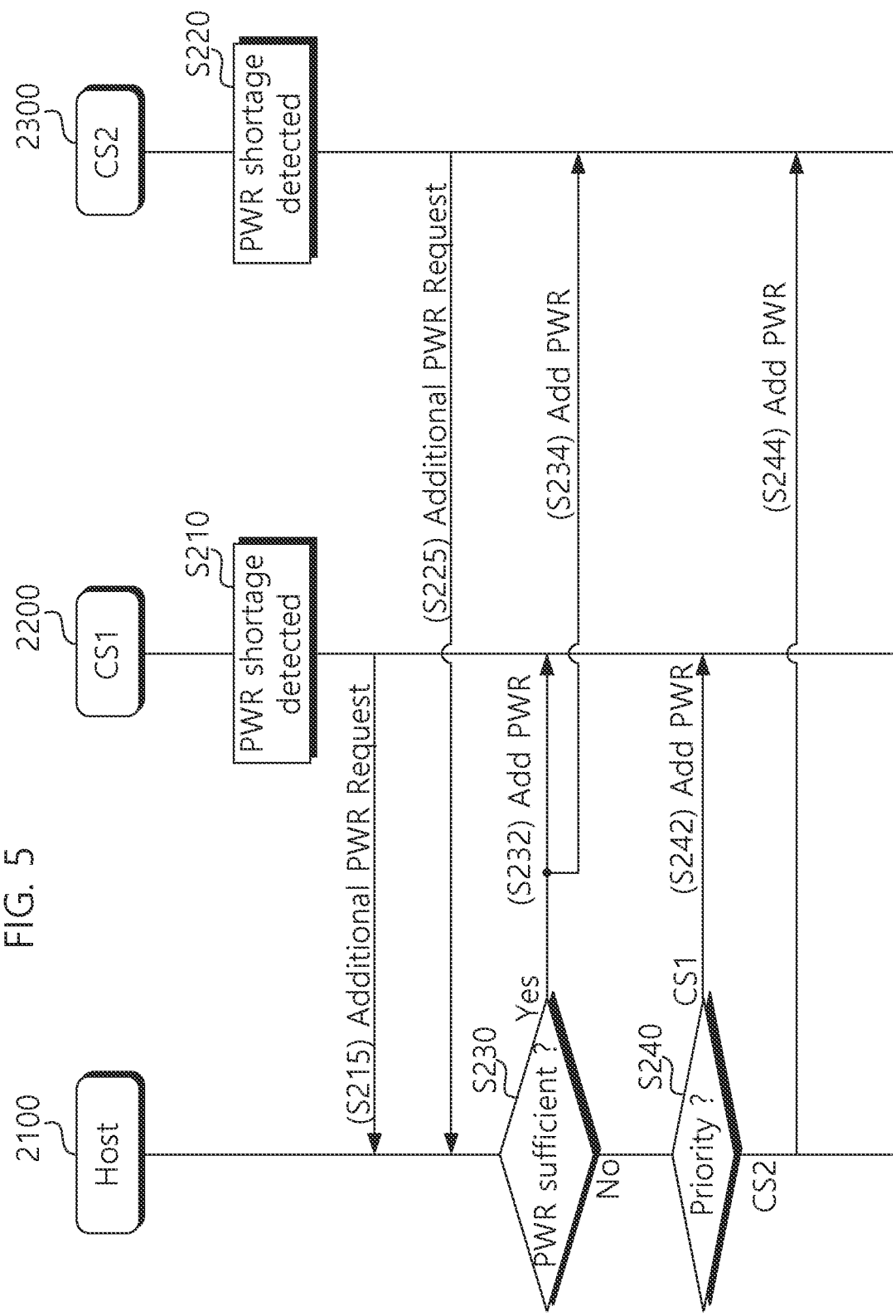
FIG. 5 is a diagram illustrating a method of supplying additional power by performance monitoring modules of the computational storage devices of FIG. 4 according to some embodiments of the present invention.

FIG. 5 is a diagram illustrating a method of supplying additional power by performance monitoring modules of the computational storage devices of FIG. 4 according to some embodiments of the present invention. Referring to FIG. 5, a power management method when a request for additional power is generated from both of the computational storage devices 2200 and 2300 is described.

In step S210, a power shortage state may be detected in the first computational storage device 2200. For example, the first performance monitoring module 2220 may detect the state in which the amount of calculation performed by the first computing module 2250 exceeds a reference value.

In step S215, the first performance monitoring module 2220 may transmit an additional power request to the host 2100 using the first output module 2230.

In step S220, a power shortage state of the second computational storage device 2300 may be detected at the same time as or at a similar point in time when the power shortage of the first computational storage device 2200 is detected. For example, a state in which the amount of calculation performed by the second SSD 2340 or the second computing module 2350 exceeds the reference value may be detected by the second performance monitoring module 2320.

In step S225, the second performance monitoring module 2320 may transmit an additional power request to the host 2100 using the second output module 2330.

In step S230, the host 2100 may determine whether sufficient power can be supplied to both the computational storage devices 2200 and 2300. If it is determined that the available power to be supplied to each of the computational storage devices 2200 and 2300 is sufficient ('Yes' direction), the process may move to steps S232 and S234. On the other hand, if it is determined that the available power to be supplied to each of the computational storage devices 2200 and 2300 is insufficient ('No' direction), the process may move to step S240.

In steps S232 and S234, the host 2100 may supply additional power to both the first computational storage device 2200 and the second computational storage device 2300.

In step S240, the host 2100 may determine power supply priorities of the computational storage devices 2200 and 2300. For example, the host 2100 may determine power addition priority according to the urgency or importance of a specific operation executed by each of the first computing module 2250 and the second computing module 2350. If the priority of the first computational storage device 2200 (e.g., the first computing module 2250) is higher than the second computational storage device 2300 (e.g., the second computing module 2350), the process may move to step S242. On the other hand, if the priority of the second computational storage device 2300 (e.g., the second computing module 2350) is higher that the first computational storage device 2200 (e.g., the first computing module 2250), the process may move to step S244.

In step S242, the host 2100 may increase the amount of power supplied to the first computational storage device 2200. That is, additional power may be supplied only to the first computational storage device 2200.

In step S244, the host 2100 may increase the amount of power supplied to the second computational storage device 2300. That is, additional power may be supplied only to the second computational storage device 2300.

In the above, the power supply method in which the host 2100 determines the power addition priority when additional power requests are generated from both of the computational storage devices 2200 and 2300 has been described.

Figure 6:
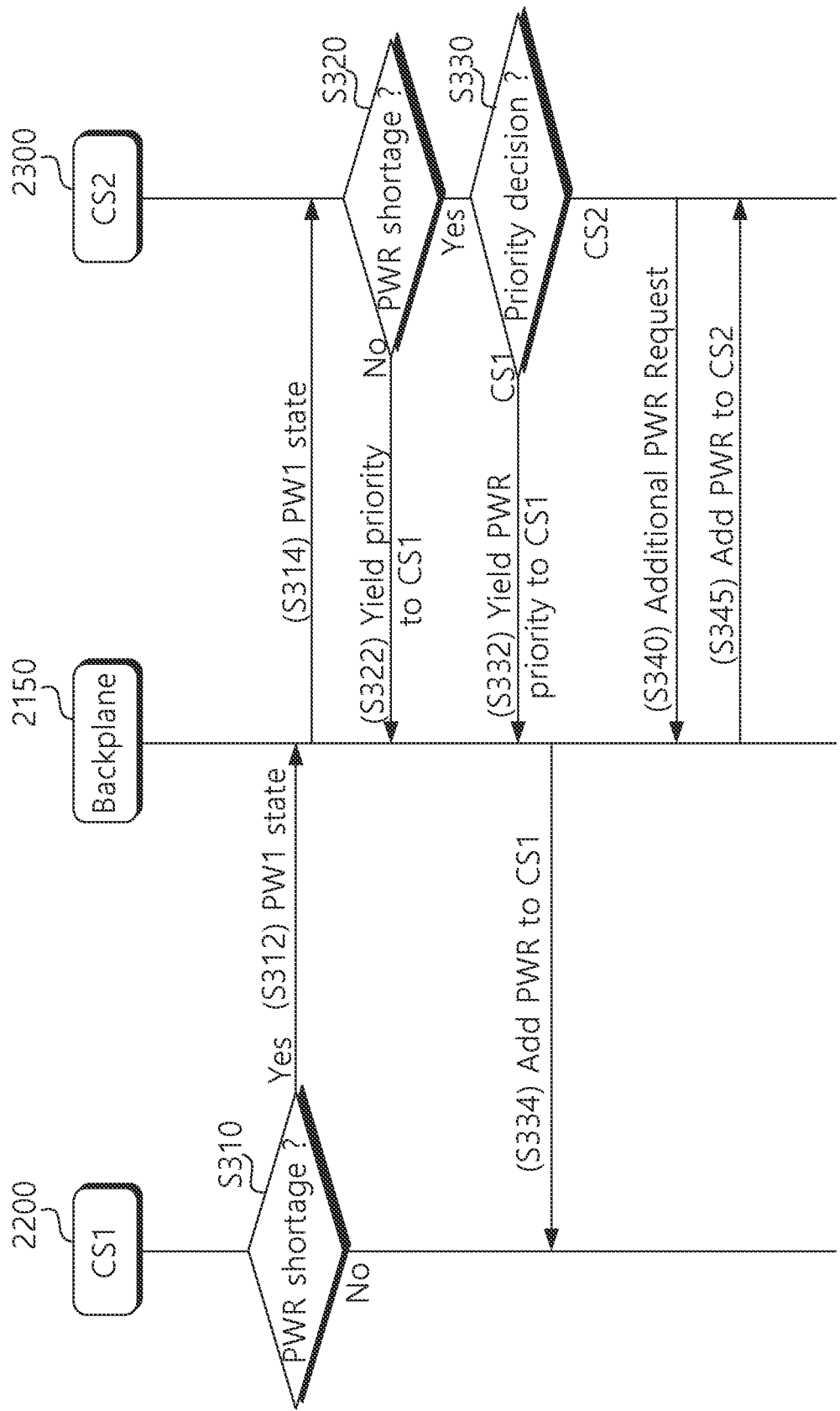
FIG. 6 is a diagram illustrating a method of supplying additional power to the computational storage devices of FIG. 4 according to some embodiments of the present invention.

FIG. 6 is a diagram illustrating a method of supplying additional power to the computational storage devices of FIG. 4 according to some embodiments of the present invention. Referring to FIG. 6, a power management method when a request for additional power is generated from both of the computational storage devices 2200 and 2300 is described.

In step S310, a power shortage state may be detected by the first performance monitoring module 2220 of the first computational storage device 2200. For example, it may be detected whether an overload of a specific component of the first computational storage device 2200 occurs at the request of the host 2100. That is, whether the amount of computation of the first SSD 2240 or the first computing module 2250 exceeds a reference value to process the request of the host 2100 may be detected by the first performance monitoring module 2220. If it is determined that additional power is required in the first computational storage device 2200 ('Yes' direction), the process may move to step S312. On the other hand, if it is determined that additional power is not required in the first computational storage device 2200 ('No' direction), the current power supply state may be maintained.

In step S312, the first performance monitoring module 2220 may transmit a power shortage state of the first computational storage device 2200 to the backplane 2150 using the first output module 2230. Then, in step S314, the backplane 2150 may transmit the power shortage state (PW1 state) of the first computational storage device 2200 to the second computational storage device 2300.

In step S320, a power shortage state of the second computational storage device 2300 may be detected at the same time as or at a similar point in time when the power shortage of the first computational storage device 2200 is detected. Whether a specific component of the second computational storage device 2300 causes a load (e.g., power shortage) may be detected according to a request of the host 2100. That is, the second performance monitoring module 2320 may detect whether the amount of operation of the second SSD 2340 or the second computing module 2350 exceeds a reference value to process the request of the host 2100. If it is determined that additional power is not needed in the second computational storage device 2300 ('No' direction), the process may move to step S322. On the other hand, if it is determined that additional power is required in the second computational storage device 2300 ('Yes' direction), the process may move to step S330.

In step S322, the second performance monitoring module 2320 may yield the supply of additional power to the first computational storage device 2200. To this end, the second performance monitoring module 2320 may transmit a message about yielding additional power to the backplane 2150 using the second output module 2330. Then, in step S334, the backplane 2150 may supply additional power to the first computational storage device 2200.

In step S330, the second performance monitoring module 2320 may determine power supply priorities of the computational storage devices 2200 and 2300. For example, the second performance monitoring module 2320 may determine the priority of power addition according to the urgency or importance of a specific operation executed in each of the first computing module 2250 and the second computing module 2350. If the priority of the first computational storage device 2200 (e.g., the first computing module 2250) is higher than the second computational storage device 2300 (e.g., the second computing module 2350), the process may move to step S332. On the other hand, when the priority of the second computational storage device 2300 (e.g., the second computing module 2350) is higher than the first computational storage device 2200 (e.g., the first computing module 2250), the process may move to step S340.

In step S332, the second performance monitoring module 2320 may yield the supply of additional power to the first computational storage device 2200. To this end, the second performance monitoring module 2320 may transmit a message about yielding additional power to the backplane 2150 using the second output module 2330. Then, in step S334, the backplane 2150 may supply additional power to the first computational storage device 2200.

In step S340, the second performance monitoring module 2320 may transmit an additional power request to the backplane 2150 using the second output module 2330.

In step S345, the backplane 2150 may increase the amount of power supplied to the second computational storage device 2300. That is, additional power may be supplied only to the second computational storage device 2300.

In the above, when a load (e.g., power shortage) is generated by a specific operation of the computational storage devices 2200 and 2300, the procedure for determining the priority by the computational storage devices 2200 and 2300 has been briefly described.

Figure 7:
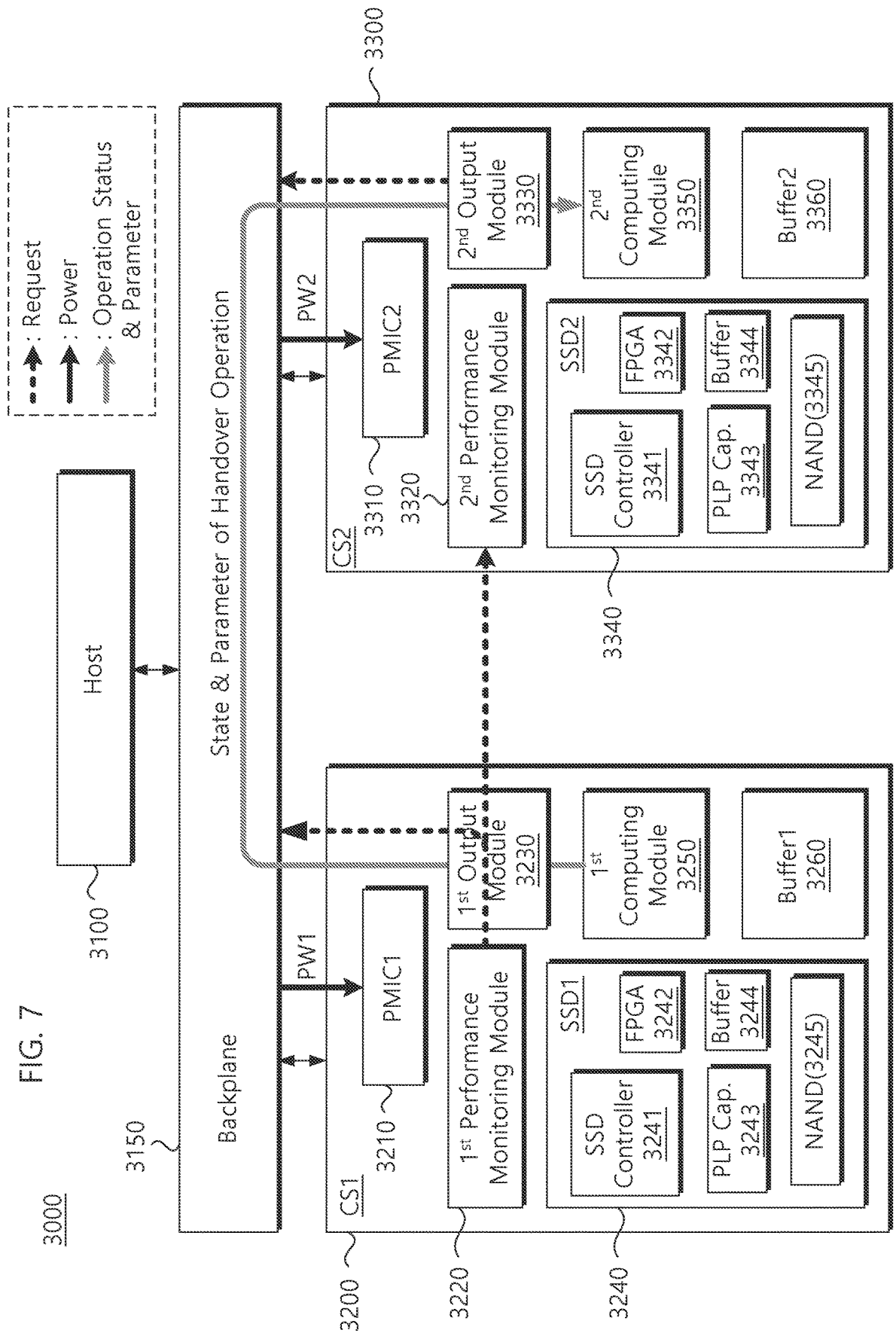
FIG. 7 is a block diagram showing a computing system according to some embodiments of the present invention.

FIG. 7 is a block diagram showing a computing system according to some embodiments of the present invention. Referring to FIG. 7, a computing system 3000 may include a host 3100 and a plurality of computational storage devices 3200 and 3300. The number of the plurality of computational storage devices are not limited to thereto. For example, the number of the plurality of computational storage devices may be more than two. The computing system 3000 may be, for example, a device such as a server or a data center that collects and processes big data. Here, main components of the host 3100, the backplane 3150, and the computational storage devices 3200 and 3300 may be substantially the same as those of FIG. 4. Therefore, a detailed description of these will be omitted. However, a function corresponding to sudden power-off by the performance monitoring modules 3220 and 3320 and the output modules 3230 and 3330 may be added to the computing system 2000 of FIG. 4.

The computational storage devices 3200 and 3300 may store data according to a request of the host 3100 or perform a specific operation requested by the host 3100. To this end, the first computational storage device 3200 may include, for example, a first PMIC 3210, a first performance monitoring module 3220, a first output module 3230, a first SSD 3240, and a first computing module 3250, and/or a first buffer 3260. Although not shown, the first computational storage device 3200 may further include a host interface. The second computational storage device 3300 may include, for example, a second PMIC 3310, a second performance monitoring module 3320, a second output module 3330, a second SSD 3340, and a second computing module 3350, and/or a second buffer 3360. Similarly, the second computational storage device 3300 may further include a host interface.

The first performance monitoring module 3220 may suspend the operation being processed by the first computing module 3250 when the power of the first computational storage device 3200 is unstable or when a sudden power-off SPO is predicted. The case where the power is unstable includes, for example, a case where the voltage supplied from the first PMIC 3210 or the voltage supplied to the first computing module 3250 drops below a reference value. For example, a case in which power is unstable may include a case in which current consumption of the first computational storage device 3200 fluctuates beyond a reference width.

When an operation being performed by the first computing module 3250 is suspended, the first performance monitoring module 3220 may transmit status information and parameters of the operation suspended by the first computing module 3250 to the first SSD 3240. Such status information and parameters may be backed up to non-volatile memory (e.g., NAND flash memory 3245) provided in the first SSD 3240 separately. The first performance monitoring module 3220 may transmit backed-up status information and parameters to the first computing module 3250 so that the first computing module 3250 may continue to perform the suspended operation when power is restored or recovered from sudden power-off SPO.

In some embodiments, the first performance monitoring module 3220 may transmit status information and parameters of the operation suspended by the first computing module 3250 to the host 3100 through the backplane 3150. Then, the host 3100 may store status information and parameters of the suspended operation and return the information to the first computing module 3250 when the power of the first computational storage device 3200 is restored. The first computing module 3250 may subsequently perform the suspended operation using the returned status information and parameters. In some embodiments, the host 3100 may transfer status information and parameters of the suspended operation to another device (e.g., the second computational storage device 3300) capable of processing, so that the other device may continue to perform the operation suspended by the first computing module 3250.

In some embodiments, when an operation being performed by the first computing module 3250 is suspended, the first performance monitoring module 3220 may transmit status information and parameters of the suspended operation to a second computational storage device 3300. For example, the first performance monitoring module 3220 may transfer status information and parameters of the operation stopped by the first computing module 3250 to the second computational storage device 3300 through the backplane 3150. Then, the second performance monitoring module 3320 of the second computational storage device 3300 may use the received status information and parameters to perform the operation stopped by the first computing module 3250. Accordingly, the operation stopped in the first computing module 3250 may be subsequently performed by the second computing module 3350. A stopped operation may refer to a suspended operation hereinafter.

Here, an example in which status information and parameters of an operation stopped in the first computing module 3250 may be transferred to the host 3100 or the second computing module 3350 has been described, but the present invention is not limited thereto. That is, the status information and parameters of the operation suspended in the second computing module 3350 may be transferred to the host 3100 or the first computing module 3250 to continue the operation suspended.

Figure 8:
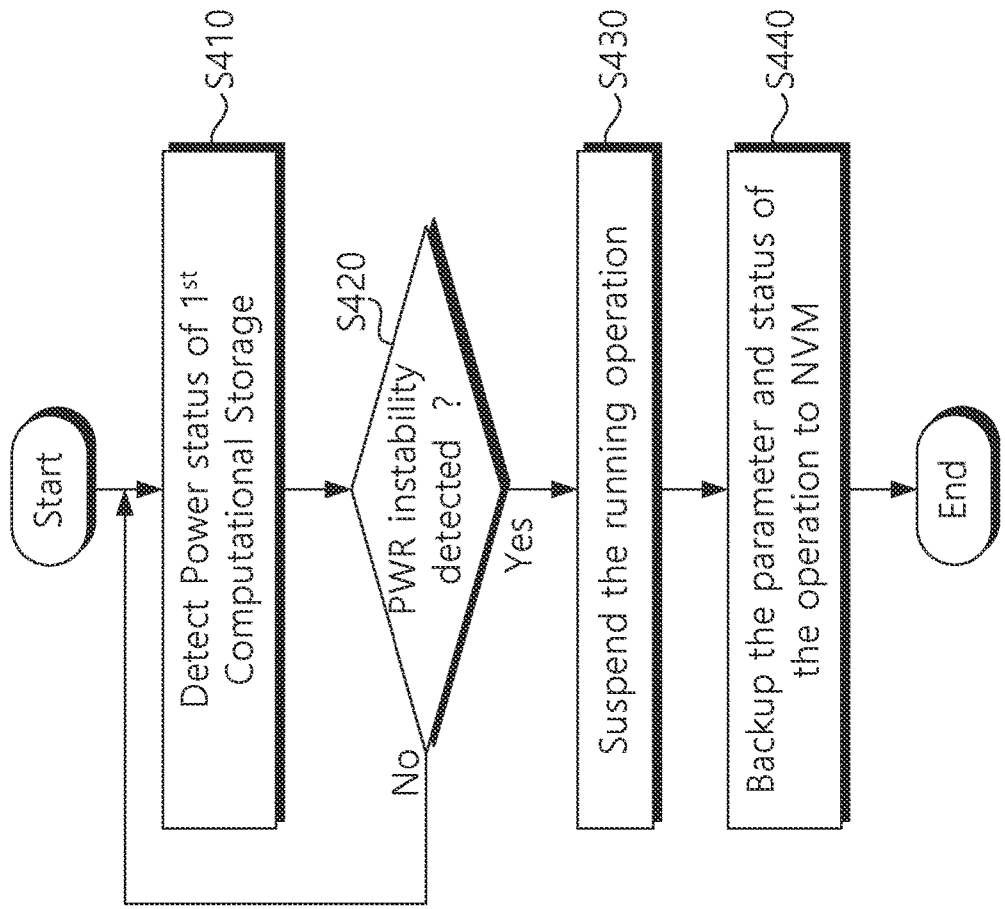
FIG. 8 is a flowchart illustrating a backup operation of a specific operation performed in the computing system of FIG. 7 according to some embodiments of the present invention.

FIG. 8 is a flowchart illustrating a backup operation of a specific operation performed in the computing system of FIG. 7 according to some embodiments of the present invention. Referring to FIG. 8, when power instability or sudden power-off SPO is detected, an operation being executed in at least one computing module of the computational storage devices 3200 and 3300 may be stopped (or suspended). In addition, status information and parameters of the suspended operation may be backed up in a non-volatile memory NVM included in the corresponding computational storage device. Here, for convenience of description, the advantages of the present invention will be described based on the control operation performed by the first performance monitoring module 3220 of the first computational storage device 3200. However, it will be well understood that the same function can also be performed by the second performance monitoring module 3320 of the second computational storage device 3300.

In step S410, the first performance monitoring module 3220 may monitor the power status of the first computational storage device 3200. The power status may include, for example, a state of a voltage supplied to the first computational storage device 3200. Also, the power status may include a case in which a sudden power-off SPO is detected in any one of the components of the first computational storage device 3200.

In step S420, the first performance monitoring module 3220 may determine whether power instability is detected. For example, this case may correspond to a case in which power shortage is caused by a specific operation of the first SSD 3240 or the first computing module 3250 and the power supply voltage for the first computational storage device 3200 (e.g., the first SSD 3240 and/or the first computing module 3250) is lowered below a reference value. In some embodiments, sudden power-off SPO may be detected due to an excessive workload for the first SSD 3240 or the first computing module 3250 or other factors. If power instability is not detected ('No' direction), the procedure may return to step S410. On the other hand, if power instability is detected ('Yes' direction), the procedure may move to step S430.

In step S430, the first performance monitoring module 3220 may suspend the operation processed by the first computing module 3250 (and/or by the first SSD 3240 or the first SSD controller 3241 of the first SSD 3240).

In step S440, the first performance monitoring module 3220 may back up status information and parameters of the operation suspended by the first computing module 3250. For example, the first performance monitoring module 3220 may back up parameters of the stopped state and progress state of the operation stopped (suspended) by the first computing module 3250 to the nonvolatile memory NVM. Here, the nonvolatile memory NVM may be a separate memory prepared for backup or a NAND flash memory 3245 of the first SSD 3240.

In the above, a method of proceeding to the power loss protection PLP mode of the first computational storage device 3200 according to some embodiments of the present invention has been briefly described. Thereafter, when power is restored, the backed-up status data and parameters may be loaded into the first computing module 3250 (and/or the first SSD 3240 or the first SSD controller 3241 of the first SSD 3240) again, and the suspended operation may be subsequently performed.

Figure 9:
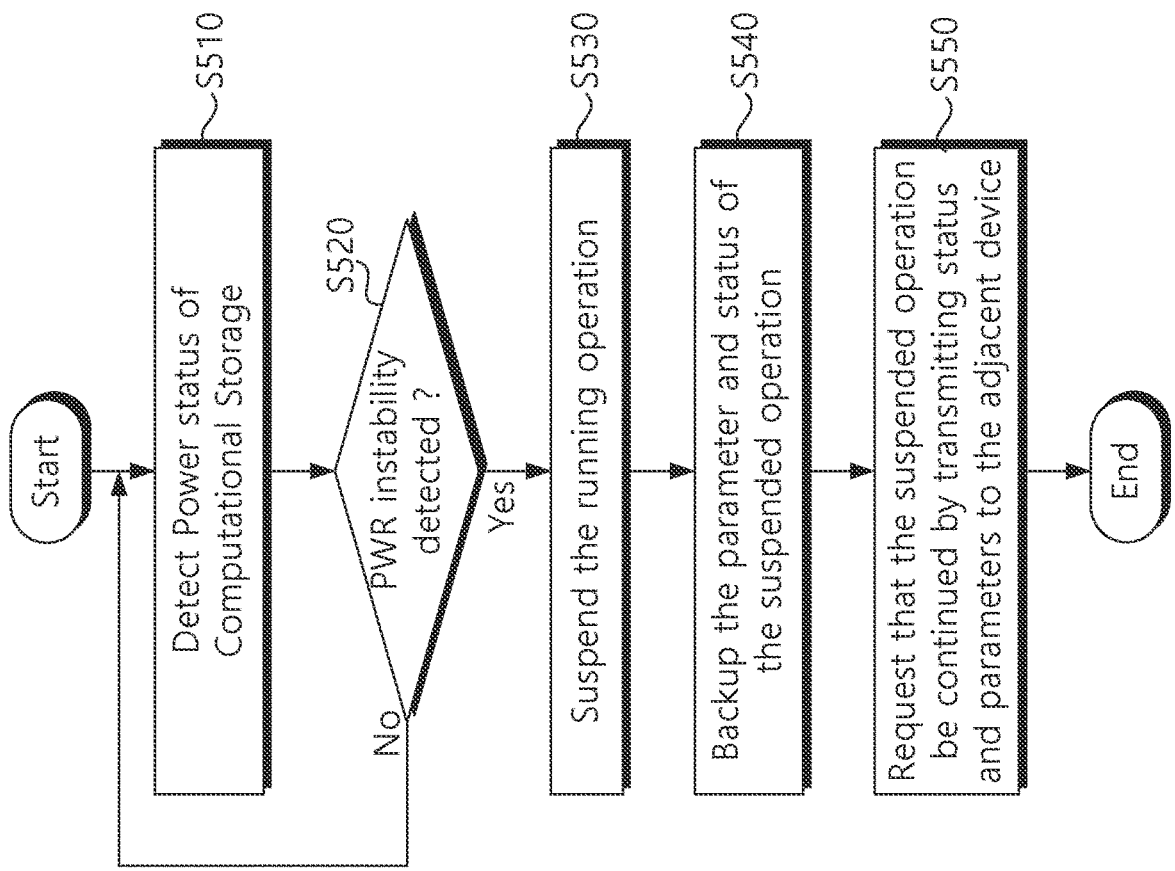
FIG. 9 is a flowchart illustrating a backup operation of operations performed in the computing system of FIG. 7 according to some embodiments of the present invention.

FIG. 9 is a flowchart illustrating a backup operation of operations performed in the computing system of FIG. 7 according to some embodiments of the present invention. Referring to FIG. 9, when power instability or sudden power-off SPO is detected, an operation being executed in the first computing module 3250 of the first computational storage device 3200 may be stopped (suspended). In some embodiments, status information and parameters of the suspended operation may be backed up in non-volatile memory NVM. The backed up status information and parameters may be passed on to other devices electrically connected to the backplane 3150 and used to continue the suspended operation.

In step S510, the first performance monitoring module 3220 may monitor the power status of the first computational storage device 3200. That is, the first performance monitoring module 3220 may detect a drop in voltage supplied to the first computational storage device 3200 or sudden power-off SPO.

In step S520, the first performance monitoring module 3220 may detect power instability. For example, the first performance monitoring module 3220 may detect a case in which power shortage is caused by a specific operation of the first SSD 3240 or the first computing module 3250 and the supply voltage is lowered below a reference value. For example, sudden power-off SPO may be detected in the first SSD 3240 or the first computing module 3250 due to an excessive workload or other factors. If power instability is not detected ('No' direction), the procedure may return to step S510. On the other hand, if power instability is detected ('Yes' direction), the procedure may move to step S530.

In step S530, the first performance monitoring module 3220 may suspend the operation processed by the first computing module 3250 (and/or by the first SSD 3240 or the first SSD controller 3241 of the first SSD 3240).

In step S540, the first performance monitoring module 3220 may back up status information and parameters of the operation suspended in the first computing module 3250 (and/or by the first SSD 3240 or the first SSD controller 3241 of the first SSD 3240). For example, the first performance monitoring module 3220 may back up parameters of the stopped state and the progress state of the operation stopped by the first computing module 3250 (and/or by the first SSD 3240 or the first SSD controller 3241 of the first SSD 3240) to the nonvolatile memory NVM. Here, the nonvolatile memory NVM may be a separate memory prepared for backup or a NAND flash memory 3245 of the first SSD 3240.

In step S550, the first performance monitoring module 3220 may request the host 3100 or the second computational storage device 3300 to continue the suspended operation. That is, the first performance monitoring module 3220 may transfer the backed up status information and parameters to the host 3100 or the second computational storage device 3300 through the backplane 3150. Then, the host 3100 may use the backed-up status information and parameters to instruct another device (e.g., the second computational storage device 3300) that stably operates to continue performing the suspended operation. In some embodiments, when the status information and parameters that are backed up may be directly delivered to the second computational storage device 3300, the operation stopped (suspended) by the first computational storage device 3200 may be subsequently executed by the second computational storage device 3300.

In the above, a method of proceeding to the power loss protection PLP mode of the first computational storage device 3200 according to some embodiments of the present invention has been briefly described.

Figure 10:
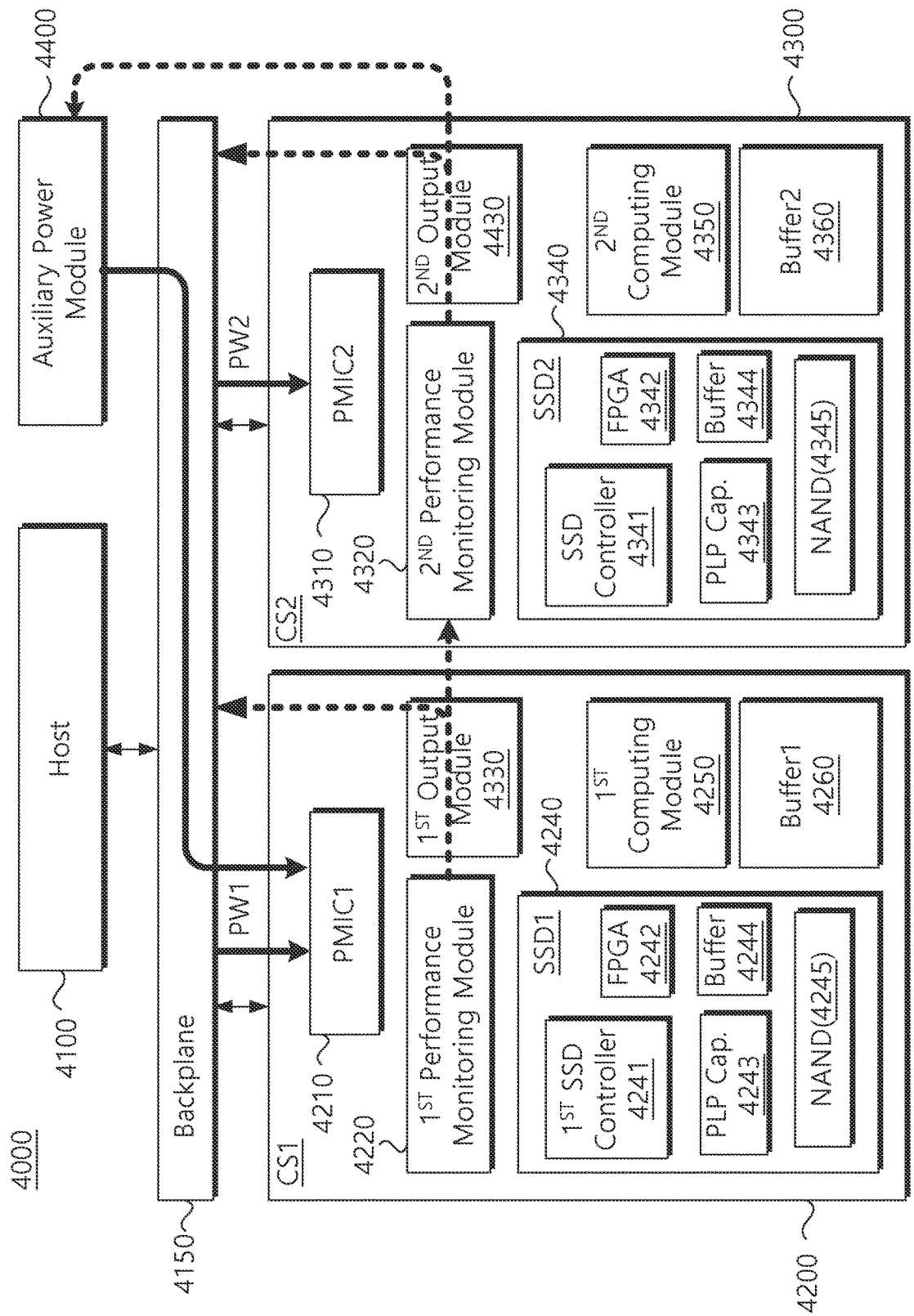
FIG. 10 is a block diagram showing a computing system according to some embodiments of the present invention.

FIG. 10 is a block diagram showing a computing system according to some embodiments of the present invention. Referring to FIG. 10, a computing system 4000 may include a host 4100, a plurality of computational storage devices 4200 and 4300, and an auxiliary power module 4400. The number of the plurality of computational storage devices are not limited to thereto. For example, the number of the plurality of computational storage devices may be more than two. The computing system 4000 may be, for example, a device such as a server or a data center that collects and processes big data. Here, main components of the host 4100, the backplane 4150, and the computational storage devices 4200 and 4300 are substantially the same as those of FIG. 4 or FIG. 7. Therefore, a detailed description of these will be omitted.

The computational storage devices 4200 and 4300 may store data according to a request of the host 4100 or perform a specific operation requested by the host 4100. To this end, the first computational storage device 4200 may include, for example, a first PMIC 4210, a first performance monitoring module 4220, a first output module 4230, a first SSD 4240, a first computing module 4250, and/or a first buffer 4260. The second computational storage device 4300 may include, for example, a second PMIC 4310, a second performance monitoring module 4320, a second output module 4330, a second SSD 4340, a second computing module 4350, and/or a second buffer 4360.

The first performance monitoring module 4220 and the second performance monitoring module 4320 of the computational storage devices 4200 and 4300 may perform the operation of the first performance monitoring module 2220 or the second performance monitoring module 2320 of FIG. 4. For example, the first performance monitoring module 4220 may monitor the workload or calculation amount of the first SSD 4240 or the first computing module 4250. Further, the first performance monitoring module 4220 may transmit an additional power request to the backplane 4150 or the host 4100 through the first output module 4230 when an operation amount equal to or greater than a reference value is observed in a specific component of the first computational storage device 4200. Then, power PW1 supplied to the first computational storage device 4200 by the backplane 4150 or the host 4100 may increase. In this case, power of the auxiliary power module 4400 may be used to provide additional power. The second performance monitoring module 4320 may also perform substantially the same monitoring as the first performance monitoring module 4220 and transmit an additional power request.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence. Moreover, the function or operation in the specific block (e.g., step) may be separated into multiple blocks (e.g., steps) and/or may be at least partially integrated.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of list of elements and may not modify the individual elements of the list. When referring to "C to D", this means C inclusive to D inclusive unless otherwise specified.

It will be understood that, although the terms "first", "second", "third", and so on may be used herein to illustrate various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the scope of the present disclosure.

It will be understood that when an element or layer is referred to as being "connected to", or "coupled to" another element or layer, it may be directly on, connected to, or coupled to the other element or layer, or one or more intervening elements or layers may be present. In contrast, when an element is referred to as being "directly coupled," "directly connected," or "directly responsive" to, or "directly on," another element, there are no intervening elements present. In addition, "electrical connection" conceptually includes a physical connection and a physical disconnection. In addition, it will also be understood that when an element or layer is referred to as being "between" two elements or layers, it may be the only element or layer between the two elements or layers, or one or more intervening elements or layers may also be present.

The above are specific embodiments for carrying out the present invention. In addition to the above-described embodiments, the present invention may include simple design changes or easily changeable embodiments. In addition, the present invention will include techniques that can be easily modified and implemented using the embodiments. Therefore, the scope of the present invention should not be limited to the above-described embodiments, and should be defined by the claims and equivalents of the claims of the present invention as well as the claims to be described later.

What is claimed is:

1. A computational storage device that is configured to be electrically connected to a host and/or a computational device, comprising:
    a power management integrated circuit that is configured to distribute power;
    a storage that is configured to store data using a first voltage provided from the power management integrated circuit;
    a computing module that is spaced apart from the host and is configured to perform an operation that is allocated by the host using a second voltage provided from the power management integrated circuit; and
    a performance monitoring module that is configured to monitor a first workload, a first amount of computation, and/or a first power state of the storage and/or is configured to monitor a second workload, a second amount of computation, and/or a second power state of the computing module and is configured to send a request for additional power to the host based on a monitoring result that is generated by the performance monitoring module,
    wherein the performance monitoring module is spaced apart from the host,
    wherein the performance monitoring module is configured to manage the operation to be performed by the computing module by requesting additional power to the host when the second power state is expected to fall below a reference value or transmit status information and parameters of the operation to the host or the computational device when the second power state is expected to fall below the reference value.

2. The computational storage device of claim 1, further comprising:
    an output module that is configured to transmit the request for the additional power to the host or a backplane that is electrically connected to the host and the computational storage device under control of the performance monitoring module.

3. The computational storage device of claim 1, wherein the storage includes an operation block that performs an auxiliary operation for input/output of data, and
    wherein the operation includes an artificial intelligence operation and/or a machine learning operation.

4. The computational storage device of claim 1, wherein the performance monitoring module is configured to determine whether to start or end a power loss protection mode based on the first power state of the storage and/or the second power state of the computing module.

5. The computational storage device of claim 4, wherein, during the power loss protection mode, the performance monitoring module is configured to suspend the operation and back up the status information and the parameters of the operation, and transmit the status information and the parameters that are backed up to the host and/or the storage.

6. The computational storage device of claim 5, wherein the performance monitoring module includes a buffer that is configured to store the monitoring result and/or the status information and the parameters that are backed up.

7. The computational storage device of claim 5, wherein, after the power loss protection mode ends, the performance monitoring module is configured to control the computing module to continue the operation that is suspended by using the status information and the parameters that are backed up.

8. The computational storage device of claim 1, wherein the storage includes a storage controller and a field programmable gate array, and
    wherein the performance monitoring module is configured to separately monitor the storage controller and the field programmable gate array.

9. A computational storage device that is configured to be electrically connected to a host and/or a computational device, comprising:
    a power management integrated circuit that is configured to distribute power;
    a storage that is configured to store data using a first voltage provided from the power management integrated circuit;
    a computing module that is spaced apart from the host and is configured to perform an operation allocated by the host using a second voltage provided from the power management integrated circuit; and
    a performance monitoring module that is configured to monitor a first workload, a first amount of computation, and a first power state of the storage and/or is configured to monitor a second workload, a second amount of computation, and a second power state of the computing module and is configured to send a request for additional power to the host based on a monitoring result that is generated by the performance monitoring module,
    wherein the performance monitoring module is spaced apart from the host
    wherein the performance monitoring module is configured to manage the operation to be performed by the computing module by requesting additional power to the host when the second power state is expected to fall below a reference value or transmit status information and parameters of the operation to the host or the computational device when the second power state is expected to fall below the reference value.

10. The computational storage device of claim 9, wherein the storage includes a storage controller and a field programmable gate array, and wherein the performance monitoring module is configured to separately monitor the storage controller and the field programmable gate array.

11. The computational storage device of claim 9, wherein the storage includes an operation block that performs an auxiliary operation for input/output of data, and
wherein the operation includes an artificial intelligence operation and/or a machine learning operation.

12. The computational storage device of claim 9, wherein the performance monitoring module is configured to determine whether to start or end a power loss protection mode based on the first power state of the storage and/or the second power state of the computing module.

13. The computational storage device of claim 12, wherein, during the power loss protection mode, the performance monitoring module is configured to suspend the operation and back up the status information and the parameters of the operation and transmit the status information and parameters that are backed up to the host and/or the storage.

14. The computational storage device of claim 13, wherein the performance monitoring module includes a buffer that is configured to store the monitoring result and/or the status information and the parameters that are backed up.

15. The computational storage device of claim 13, wherein, after the power loss protection mode ends, the performance monitoring module is configured to return the status information and the parameters from the host and/or from the storage to the computing module and is configured to control the computing module to subsequently perform the operation that is suspended based on the status information and the parameters that are returned from the host and/or from the storage.

16. A power management method for a plurality of computational storage devices that are electrically connected to a backplane, the method comprising:
monitoring a workload, an amount of computation, and/or a power state of each of the plurality of computational storage devices;
requesting additional power from a host that is electrically connected to the plurality of computational storage devices and the backplane or from the backplane based on a monitoring result that is generated by the monitoring;
determining an additional power supply priority of each of the plurality of computational storage devices; and
supplying the additional power to a computational storage device that is selected among the plurality of computational storage devices based on the additional power supply priority,
wherein each of the plurality of computational storage devices comprises:
a solid state drive that is configured to store data;
a computing module that is spaced apart from the host and is configured to perform an operation allocated by the host; and
a performance monitoring module that is configured to determine whether to request the additional power based on a first workload and/or a first calculation amount of the solid state drive and/or a second workload and/or a second calculation amount of the computing module,
wherein the performance monitoring module is spaced apart from the host.

17. The power management method of claim 16, wherein the computing module is dedicated to performing the operation allocated by the host, and
wherein the performance monitoring module is configured to manage the operation to be performed by the requesting the additional power from the host when the power state is expected to fall below a reference value or is configured to transmit status information and parameters of the operation to the host or one of the plurality of computational storage devices when the power state is expected to fall below the reference value.

18. The power management method of claim 17, wherein each of the plurality of computational storage devices includes an output module that is configured to transmit the first workload and/or the first calculation amount of the solid state drive and/or the second workload and/or the second calculation amount of the computing module, the power state, and a request for the additional power to the backplane and/or the host.

19. The power management method of claim 17, wherein the performance monitoring module is configured to suspend the operation based on the power state and back up the status information and the parameters of the operation that is suspended.

20. The power management method of claim 19, wherein the performance monitoring module is configured to transfer the status information and the parameters to one of the plurality of computational storage devices to perform the operation that is suspended.

* * * * *